(12) United States Patent
Lorenz

(10) Patent No.: US 7,602,334 B1
(45) Date of Patent: Oct. 13, 2009

(54) METHOD AND SYSTEM OF A MOBILE SUBSCRIBER ESTIMATING POSITION

(75) Inventor: Robert G. Lorenz, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 0 days.

(21) Appl. No.: 12/080,639

(22) Filed: Apr. 3, 2008

(51) Int. Cl.
*G01S 1/02* (2006.01)
*G01S 3/02* (2006.01)

(52) U.S. Cl. .................... 342/357.06; 342/457
(58) Field of Classification Search ........... 342/457, 342/463–465, 357.06; 701/213, 215; 455/456.5, 455/456.6
See application file for complete search history.

(56) References Cited

U.S. PATENT DOCUMENTS

| | | | |
|---|---|---|---|
| 5,874,914 A | | 2/1999 | Krasner |
| 6,249,253 B1* | | 6/2001 | Nielsen et al. ............... 342/463 |
| 6,427,120 B1 | | 7/2002 | Garin et al. |
| 6,933,886 B1 | | 8/2005 | Sahai et al. |
| 2005/0037775 A1 | | 2/2005 | Moeglein et al. |
| 2006/0240839 A1* | | 10/2006 | Chen et al. ............... 455/456.1 |
| 2007/0018891 A1 | | 1/2007 | Golden et al. |
| 2007/0224951 A1 | | 9/2007 | Gilb et al. |
| 2008/0094277 A1* | | 4/2008 | Rick ..................... 342/357.07 |

OTHER PUBLICATIONS

Agarwal et al., Algorithms for GPS operation indoors and downtown, 2002, GPS Solutions (2002).
IEEE Standards Activties Department, Part 16: Air Interface for Broadband Wireless Access Systems, Oct. 2007, P802.16Rev2/D1, New York, NY.
Per Enge et al., Improving GPS Coverage and Continuity: Indoors and Downtown, Stanford University, Dated: Sep. 2001; 2001 GPS Proceedings.

* cited by examiner

*Primary Examiner*—Dao L Phan
(74) *Attorney, Agent, or Firm*—Brian R. Short

(57) ABSTRACT

A method and apparatus of a mobile subscriber (MS) estimating position are disclosed. One method includes the MS receiving at least one satellite transmitted signal with a first receiver, and estimating a time of arrival of the at least one satellite transmitted signal. The MS additionally receives at least one terrestrial base station signal with a second receiver, and estimates a time of arrival of the at least one terrestrial base station signal. The MS estimates its position based on the estimated time of arrival of the at least one satellite transmitted signal and the estimated time of arrival of the at least one terrestrial base station signal.

20 Claims, 8 Drawing Sheets

METHOD AND SYSTEM OF A MOBILE SUBSCRIBER ESTIMATING POSITION

FIELD OF THE DESCRIBED EMBODIMENTS

The described embodiments relate generally to wireless positioning. More particularly, the described embodiments relate to methods and systems for computing position using global positioning systems (GPS) signals and at least one signal from a wireless communication system.

BACKGROUND

The NAVSTAR Global Positioning System (GPS) comprises a constellation of satellites and a control segment whose function it is to monitor and update the clocks, orbits, and navigation messages of these satellites. GPS receives receive radio transmissions from satellite-based radio navigation systems and use those received transmissions to determine the location of the receiver. The location of the receiver may be determined by applying the well-known concept of trilateration of the distances from the receiver to satellites having known satellite locations.

Generally, each satellite in a satellite-based radio navigation system broadcasts a radio transmission, which contains its orbit parameters and a ranging signal. Together, these two quantities allow the location of the satellite to be known as a function of time. Each of the orbiting satellites in the GPS system contains four highly accurate atomic clocks: two Cesium and two Rubidium. These clocks generate precisely timed binary codes (also known as a pseudo random noise "PRN," or pseudo noise "PN" code) that are transmitted to earth. The PN codes identify the specific satellite in the constellation. Each satellite transmits a set of digitally coded ephemeris data that completely defines the orbit of the satellite. This ephemeris data provides an accurate indication of the position of the satellite as a function of time.

Atomic clocks are very precise; however, a slight error (generally known as clock drift) may occur in the clocks over time resulting in satellite clock errors of about 15 ns per day with corresponding range errors of about 5 meters. In order to compensate for the error, the accuracy of the satellite atomic clocks are continuously monitored from ground stations in the GPS control system and any detected errors and drift in the clock of the satellites may be calculated and transmitted by the satellites as part of a navigation message in the form of three coefficients of a second-degree polynomial.

In the case of GPS, there is nominally a constellation of 24 operational satellites above the Earth. Each satellite has individual PN codes, a nearly circular orbit with an inclination of 55 degrees to the equator with a height of approximately 10,900 nautical miles (20,200 kilometers) above Earth and an orbital period of approximately 12 hours. Each GPS satellite transmits a microwave radio signal composed of two carrier frequencies modulated by two digital codes and a navigation messages. The two carrier frequencies are referred to as the "L1" and "L2" carriers and are transmitted at 1,572.42 megahertz (MHz) and 1,277.60 MHz, respectively. The two GPS codes are called the coarse acquisition (C/A-code) and precision (P-code). Each code consists of a stream of binary digits, zeros and ones, known as "chips." Both the C/A-code and P-code are generally referred to as a PN code because they look like random noise-like signals. Presently, the C/A-code is modulated only on the L1 carrier while the P-code is modulated on both L1 and L2 carriers.

The C/A-code is a length 1023 sequence and has a chip rate of 1.023 MHz. The code repeats itself nominally every millisecond. Each satellite is assigned a unique C/A-code, which enables a GPS receiver to identify which satellite is transmitting a particular code. The C/A-code range measurement is relatively less precise when compared to the P-code but it is also less complex and available to all users. The P-code is mostly limited in use to the United States government and military. At present an encrypted version of the P-code is transmitted. This encrypted version of the P code is known as the Y code.

Each satellite also transmits a GPS navigation message that is a data stream that further modulates the L1 carrier as binary bi-phase modulation at 50 bits per second (bps). The navigation message contains, along with other information, the ephemeris data which defines the coordinates of the GPS satellites as a function of time, the satellite health status, the satellite clock corrections, and the satellite almanac. Each satellite transmits its own navigation message with information on the other satellites, such as the approximate location and health status.

To receive the signals transmitted by the satellites, a GPS receiver generates and aligns replicas of the code and carrier signals contained in the received signal for each received satellite. The relative distances to a plurality of satellites are measured by observing what phases of the code replicas correlate or align with the incoming GPS signal. These relative distances are used to solve for position. As the clock in a standalone GPS receiver has an arbitrary timing relationship, with respect to the common GPS time of the satellites, it is necessary to solve for the receiver time in addition to the three spatial coordinates of user. Hence, four satellite range measurements are typically required to compute position. Beyond the random timing offset of the clock, the clock frequency of the MS is inevitably offset with respect to the GPS frequency in standalone applications.

Besides accuracy, another problem associated with the error of the MS clock reference relative to the GPS satellite clocks is the resulting acquisition time for the GPS receiver commonly known as the time to first fix (TTFF). For many applications, such as Emergency 911 (E911) positioning, a GPS receiver must be able to provide a position solution in a short period of time after being commanded to compute this position. Unfortunately, the MS clock reference can have substantial frequency uncertainty. The large frequency uncertainty can cause significant degradation on TTFF performance. Additionally, uncertainty in time can require the examination of many code phases. GPS satellites positioned above the earth's atmosphere, it is not always possible for a GPS receiver to receive accurate transmissions from the required number of GPS satellites necessary to calculate the position of the GPS receiver.

A GPS receiver can at time be located so that the GPS receiver can not receive strong GPS signals from at least four satellites. For example, when the GPS receiver is located indoors, the GPS signals by the GPS receiver can be greatly attenuated. The receiver may not be able to receive the at least four GPS signals, plus it can become very difficult to estimate the time of arrival of the attenuated GPS signals.

Since the inception of GPS, methods have been, and are still being, developed to reduce errors and to enhance the accuracy of the GPS systems. Further, many different methods are being implemented to provide alternative means for providing the GPS receiver with information concerning unknown variables or inaccuracies in the system such that it is not always required for the system to receive satellite transmission signals from all the satellites or to receive accurate transmission data.

It is desirable for to have a system and method for aiding mobile subscriber (MS) position estimation.

SUMMARY

An embodiment includes a method of a mobile subscriber (MS) estimating position. The method includes the MS receiving at least one satellite transmitted signal with a first receiver, and estimating a time of arrival of the at least one satellite transmitted signal. The MS additionally receives at least one terrestrial base station signal with a second receiver, and estimates a time of arrival of the at least one terrestrial base station signal. The MS estimates its position based on the estimated time of arrival of the at least one satellite transmitted signal and the estimated time of arrival of the at least one terrestrial base station signal.

Another embodiment includes a WiMAX subscriber. The subscriber includes a means for receiving at least one GPS signal with a first receiver, and estimating a time of arrival of the at least one GPS signal. The subscriber further includes means for the subscriber receiving at least one WiMAX base station signal with a second receiver, and estimating a time of arrival of the at least one WiMAX base station signal. The subscriber estimating its position based on the estimated time of arrival of the at least one GPS signal and the estimated time of arrival of the at least one WiMAX base station signal.

Other aspects and advantages of the described embodiments will become apparent from the following detailed description, taken in conjunction with the accompanying drawings, illustrating by way of example the principles of the described embodiments.

DETAILED DESCRIPTION

Embodiments of a mobile subscriber (MS) estimating position are disclosed. The embodiments include the MS receiving satellite and terrestrial base station wireless signals. The MS estimates its position based on a time of arrival of the satellite and terrestrial base station wireless signals. Various methods of aiding the position estimation are provided that are based on two-way communication with at least one of the terrestrial base stations. Information provided by the terrestrial base station enables efficient location determination.

Figure 1:
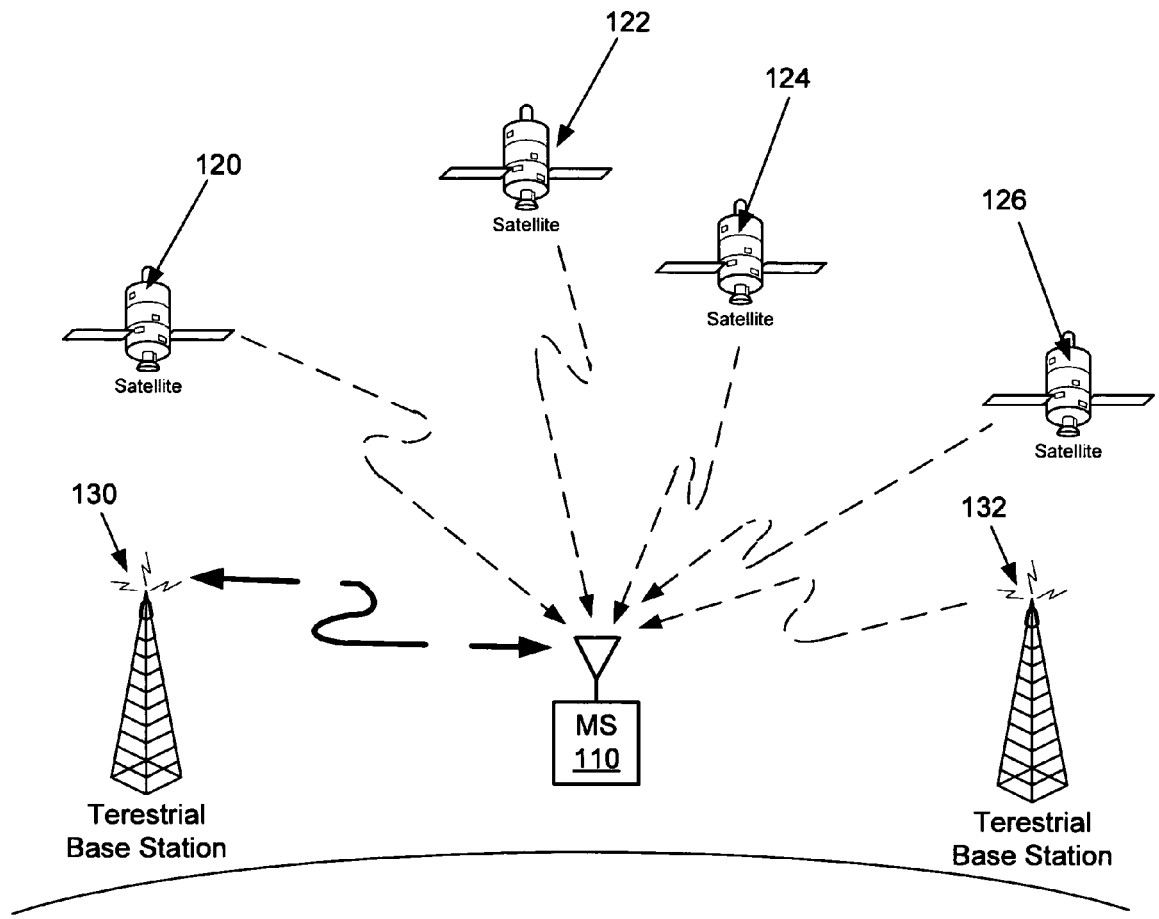
FIG. 1 shows an example of an MS receiving wireless signals from satellites and terrestrial base stations.

FIG. 1 shows an example of an MS (mobile station) 110 receiving wireless signals from satellites 120, 122, 124, 126 and terrestrial base stations 130, 132. In a typical GPS system, the MS 110 can estimate its position based, for example, on the wireless signals received from the satellites 120, 122, 124, 126. However, the GPS signals transmitted from the satellites travel long distances and have been greatly attenuated before being received by the MS 110. Additionally, the MS 110 may be located (for example, indoors) so that the wireless signals are additionally attenuated.

The methods of estimating position based on, for example, GPS signals may be greatly compromised by this additional attenuation of the GPS signals. Attenuation of the signals can make it difficult to identify the GPS signal and to estimate the times of arrival. If attenuated too much, the GPS signals can not be reliably received.

GPS uses trilateration to solve for a user's position. Solving for a user's position requires sufficient measurements to solve for the users three spatial coordinates and the receiver time. The spatial coordinates may be expressed as x, y, and z or as latitude, longitude, and elevation. If the MS receives wireless signals from enough terrestrial base stations, the MS can estimate its position based on just the terrestrial base stations, provided that the position of the terrestrial stations is known and that the time of transmissions from each of the terrestrial stations is known. Under the assumption that the times of transmissions of the satellites is known with respect to GPS time and that the positions of the terrestrial base stations is known, the MS can receive a combination of GPS (satellite) and terrestrial base station signal to supplement each other in estimating the position of the MS. That is, the MS may receive GPS signals that are greatly attenuated, but also receive a plurality of terrestrial base station signals. The MS may not be able to accurately estimate its position based on only the GPS signals, or based on only the terrestrial base station signals, but may be able to accurately estimate its position using both the GPS signal and the terrestrial base station signals.

Figure 2:
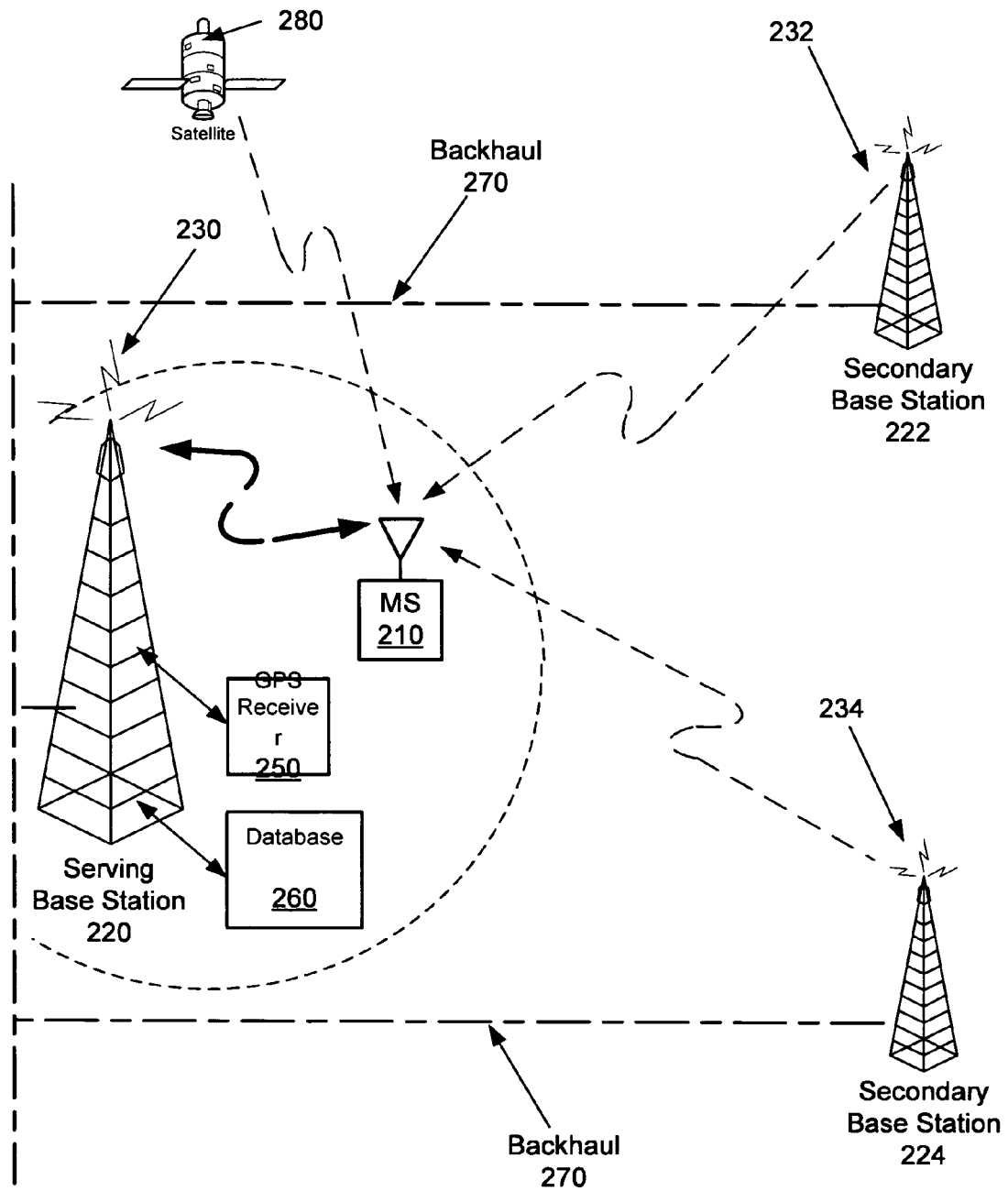
FIG. 2 shows an example of an MS communicating with a serving base station and also receiving wireless signals from secondary base stations.

FIG. 2 shows an example of an MS 210 communicating with a serving base station 220 and also receiving wireless signals from secondary base stations 222, 224. The serving base station 220 can be, for example, a WiMAX base station with which the MS 210 is maintaining two-way communication. The two-ways communication can be voice or any other type of data.

The serving base station can be defined as a base station that has been selected to maintain two-way communication with the MS 210. Usually, the serving base station is the base station than provides the MS 210 with the best quality link.

As previously described, the MS 210 can estimate its position based on wireless signals received from satellites (such as, GPS satellite 280) and the terrestrial base stations 220, 222, and 224. However, the MS 210 can additionally obtain information from the serving base station 220 that can be used to aid the MS 210. For example, the MS 210 can obtain information about the other terrestrial base stations 222, 224, such as, the positions of the other terrestrial base stations 222, 224. The network can include a backhaul connection 270 that interconnects the base stations. Therefore, the base stations can each update the other base stations with useful information.

Other information that the serving base station 220 can provide the MS 210 includes a neighbor base station advertisement list that the MS 210 can use to identify the base stations from which the MS 210 can receive terrestrial signals. The neighboring base station advertisement list can also provide the MS 210 with base station information that allows the MS 210 to be aware of other base stations that the MS 210 could select if the MS 210 changes locations. The selection can include a new serving base station, and/or a new base station for receiving terrestrial signals for position estimation by the MS 210.

The serving base station can provide timing offsets of the other terrestrial base stations the MS receiving wireless signals. Designating x, y, and z as the coordinates of the user's position and $x_i$, $y_i$, and $z_i$, as the position of the i th transmitter, the distance between the user and the i th transmitter can be given by:

$$\rho_i = \sqrt{(x-x_i)^2+(y-y_i)^2+(z-z_i)^2} \quad [1]$$

Let $r_i$ denote the pseudorange measured distance between the receiver and the transmitter according to:

$$r_i = \rho_i - cb - c\delta_i, \quad [2]$$

where c denotes the speed of light, b is the MS clock bias, and δ is the clock error of the i th transmitter. It can be observed that the pseudorange equals the geometric distance between the user and the transmitter minus two clock correction terms. The first clock correction term is specific to the MS. The second clock bias term is transmitter specific. The GPS satellites transmit the clock correction terms for their GPS signals. Therefore, the effect of the GPS satellite clock correction terms may be effectively removed. If the clock bias for a terrestrial base station is unknown, this measurement does not contribute directly to determining the user's position. While this measurement introduces additional information, it also introduces an additional variable.

Additionally, the serving base station can be equipped with its own GPS receiver 250. The base stations typically are located such that they have an unobstructed receive path for the GPS satellites, and therefore, generally receive relatively strong GPS signals. However, the MS can be located indoors, and therefore, not receive GPS signal having the same signal quality. As such, the serving base station can provide GPS satellite signal information to the MS. The GPS information provided can include, for example, information about which GPS satellites the MS is most likely to receive signals. Additionally, the information can allow the MS to limit a frequency code and phase search range of the at least one satellite transmitted signal. In the case of the WiMAX system, the base stations transmit their downlink signals synchronously with the GPS second, hence the bias with respect to GPS time is known.

The serving base station 220 can include a database that includes information that may be useful to the MS 210. The information can include both GPS satellite information and/or terrestrial base station information. This information may include a list of visible GPS satellites, their ephemeris, nominal Doppler offset, a list of nearby terrestrial base stations, the locations of these terrestrial base stations, and/or the clock offsets of these base stations.

Figure 3:
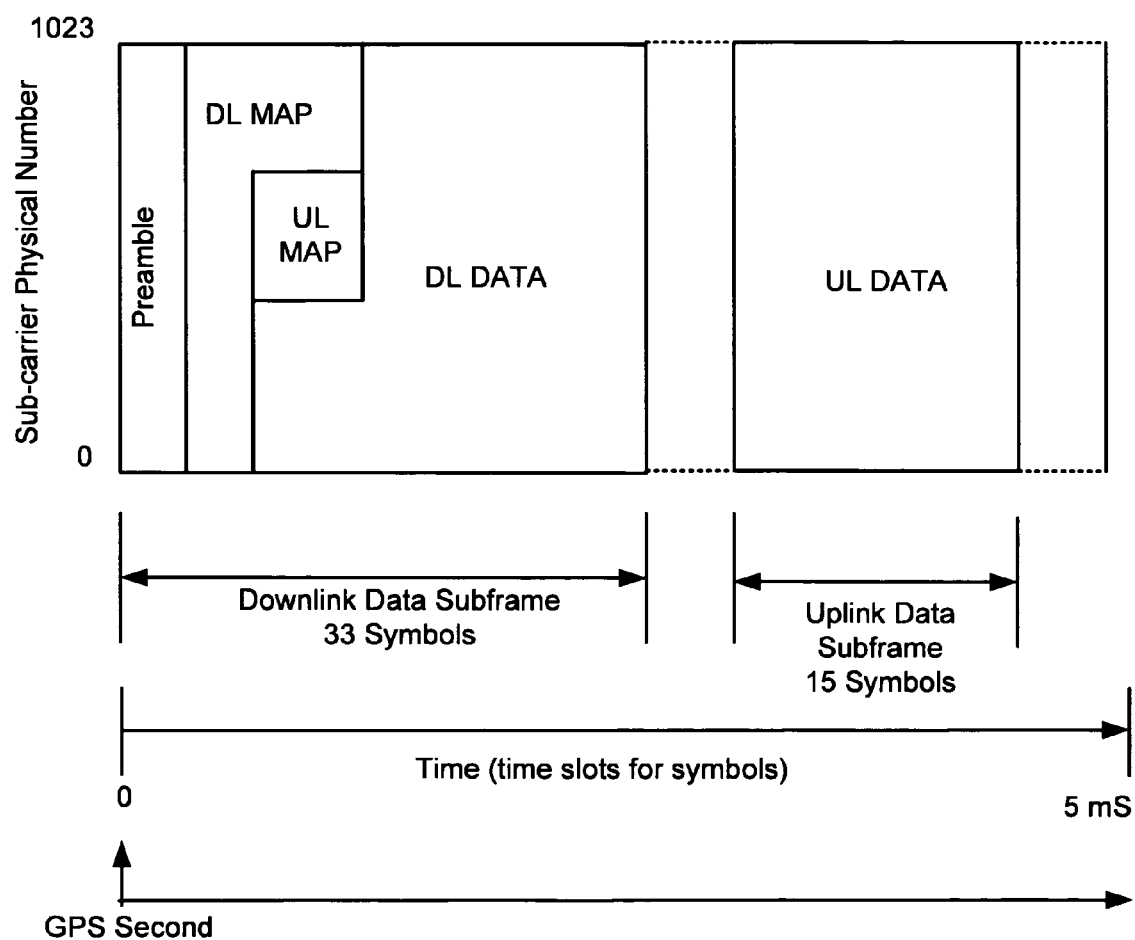
FIG. 3 shows an example of WiMAX frame that includes a preamble that an MS can use to estimate a WiMAX signal time of arrival.

FIG. 3 shows an example of WiMAX frame that includes a preamble that an MS can use to estimate a WiMAX signal time of arrival. The WiMAX signals, and therefore, the preamble, are synchronized with GPS signals. WiMAX signals can be received by an MS and used by the MS to aid in estimating its position.

One WiMAX standard P802.16Rev2/D1 (October 2007) defines the transmitter reference timing accuracy by stating:

8.4.10.1.1 Network synchronization For TDD and FDD realizations, it is recommended (but not required) that all BSs be time synchronized to a common timing signal. In the event of the loss of the network timing signal, BSs shall continue to operate and shall automatically resynchronize to the network timing signal when it is recovered. The synchronizing reference shall be a 1 pps timing pulse and may also include a 10 MHz frequency reference. These signals are typically provided by a GPS receiver.

This standard further states:

8.4.12.4 Transmitter Reference Timing Accuracy

At the BS, the transmitted DL radio frame shall be time-aligned with the 1 pps timing pulse (8.4.10.1.1). The start of the preamble symbol, excluding the CP duration, shall be time aligned with 1 pps timing pulse when measured at the antenna port.

The WiMAX downlink frame generally includes the preamble, a downlink (DL) MAP, an uplink (UL) MAP, and downlink (DL) data. The preamble is the first symbol of the DL portion of the frame. For WiMAX implementations using a Fast Fourier Transform (FFT) size of 1024, the preamble consists of 284 pilots that have a nominal spacing of three. WiMAX implementations using different FFT sizes consist of different numbers of preamble tones. There are three preamble segments which each occupy different pilot positions. The preamble pilots from the three segments are non-overlapping. A pseudorandom sequence modulates the pilots of the preamble. These sequences are chosen such that neighboring base stations do not share a common pseudorandom sequence. The pilots on the preamble are boosted by 9 dB. For this reason, the power on the preamble is nominally higher than on any other portion of the DL subframe. The preamble does not contain any data modulation, so all pilots may be used in determining the channel impulse response. The time of arrival of a signal from a specific base station can be deduced from the channel impulse response. The base station to be measured may be selected by choosing the correct preamble segment and pseudorandom sequence. The preamble exhibits several useful properties. The preamble is transmitted with high power. The preamble had a large time-bandwidth product. The preamble is not modulated by data. The preamble has a regular pilot spacing of three which implies that the channel impulse response contains substantially replicas. The spacing between these replicas provides a large interval over which timing ambiguity due to the presence of replicas may be avoided.

Figure 4:
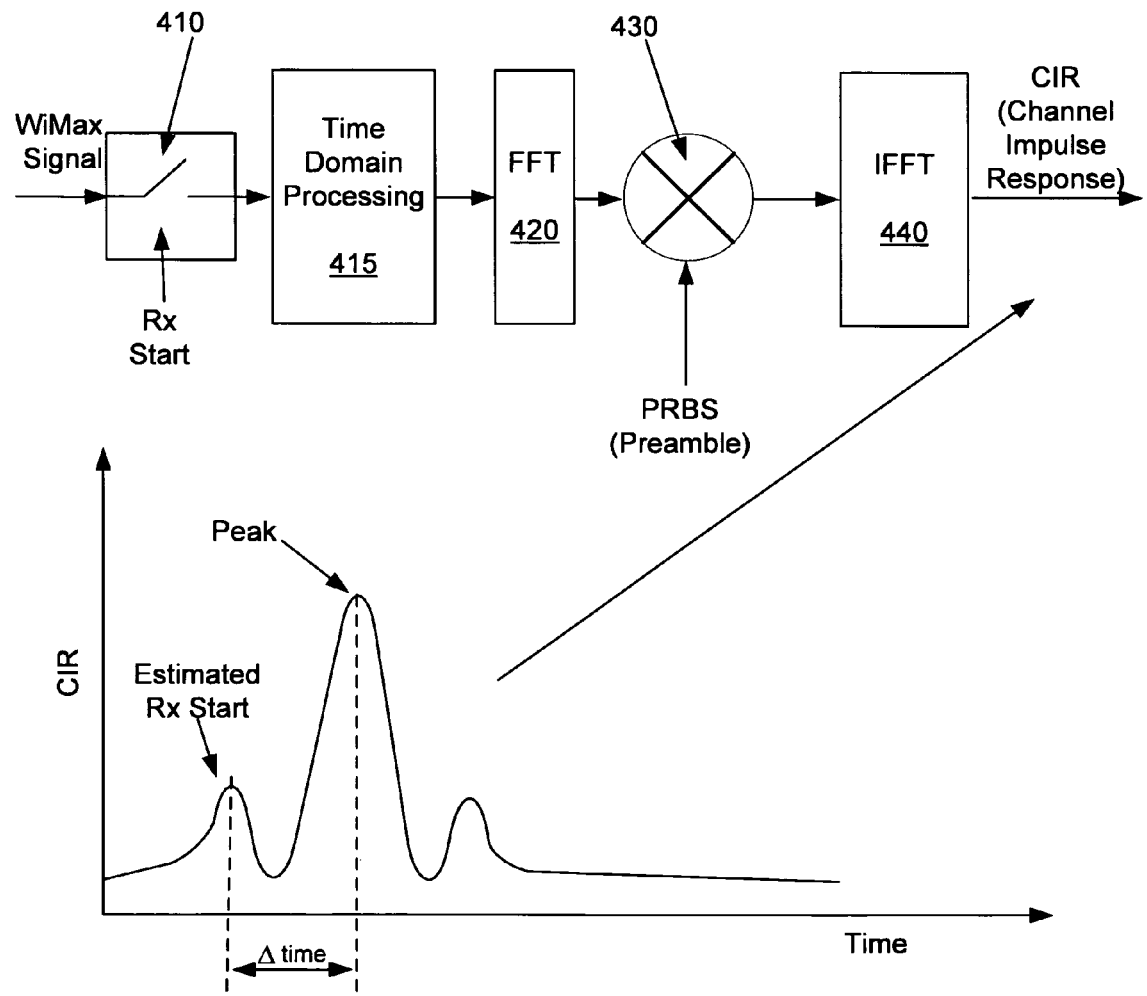
FIG. 4 shows a block diagram of an embodiment within an MS that estimates time of arrival of a preamble of a downlink frame of a terrestrial base station signal.

FIG. 4 shows a block diagram of an embodiment within an MS that estimates time of arrival of a preamble of a downlink frame of a terrestrial base station signal. This embodiment can, for example, extract information from a WiMAX downlink frame preamble that can be used to estimate a time of arrival of the preamble of the WiMAX downlink frame.

More specifically, the embodiment shown provides a determining a channel impulse response of the preamble. Timing of a peak of the channel impulse response can be used to estimate the time of arrival of the WiMAX signal. The estimate can be obtained by comparing the peak of the channel impulse response with a pre-estimated start time of the WiMAX downlink frame preamble. The pre-estimated start may be based previous measurement of the peak location.

In other embodiments, the location of the first component of the CIR that exceeds a fraction of the peak amplitude may be used as an estimate of the time of arrival of the terrestrial signal. In still other embodiments, the location of the first component of the CIR that exceeds a pre-determined threshold may be used as an estimate of the time of arrival of the terrestrial signal.

As shown, the received WiMAX signal is sampled by, for example, a sampler 410 that begins sampling in response to the rx_start signal which is asserted at a pre-determined time. This time generally corresponds to an estimate of the first significant component of the channel impulse response. The sampled signal is passed through time domain processing block 415 the output of which is input to an FFT (Fast Fourier Transform) 420, correlated with a PRBS (pseudo random bit sequence) 430 that corresponds with the base station of the received WiMAX signal, and then passed through an IFFT (Inverse Fast Fourier Transform) 440 producing the channel impulse response.

Figure 5:
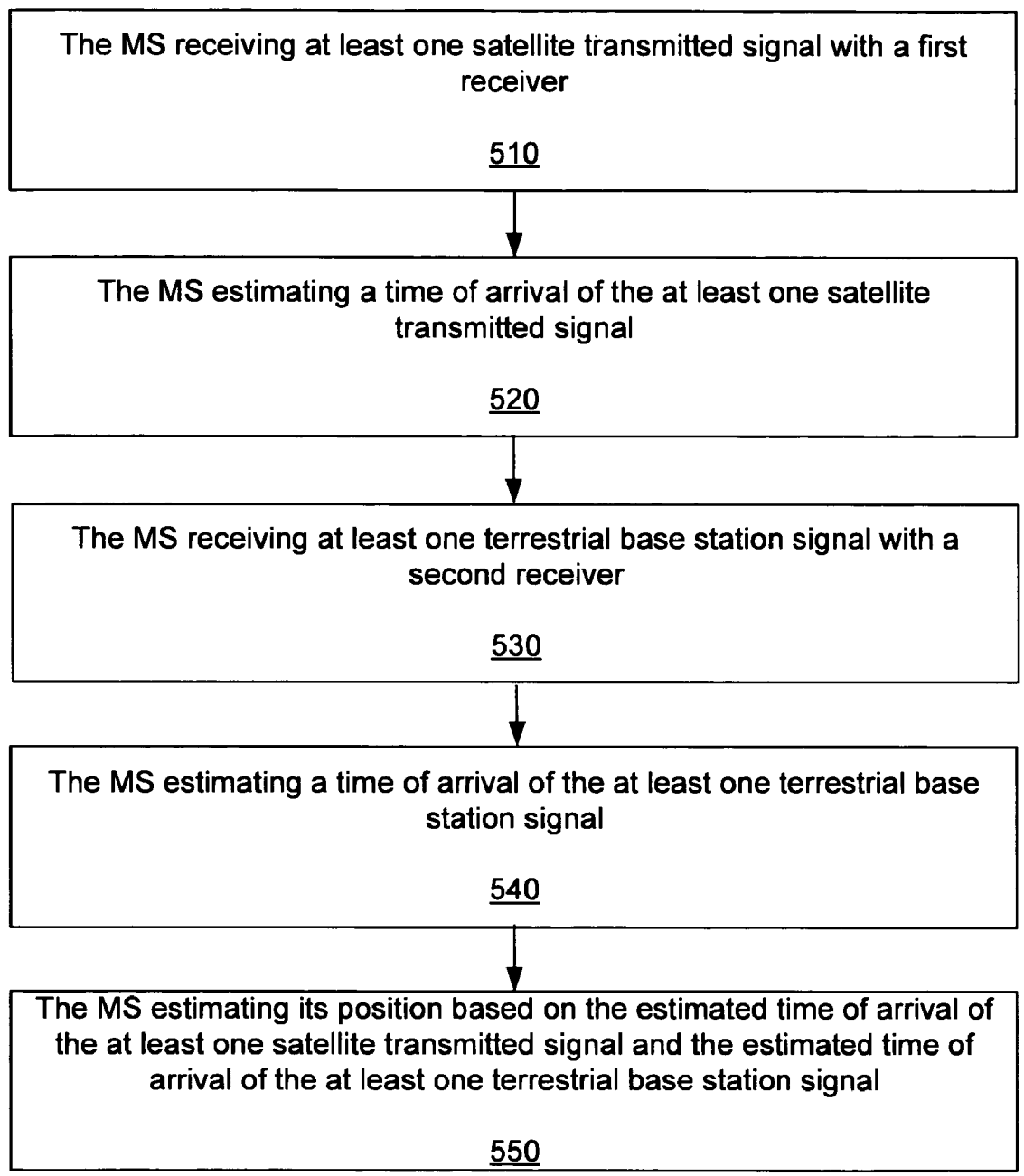
FIG. 5 is a flow chart that includes steps of one example of a method of a mobile subscriber (MS) estimating position.

FIG. 5 is a flow chart that includes steps of one example of a method of a mobile subscriber (MS) estimating position. A first step 510 includes the MS receiving at least one satellite transmitted signal with a first receiver. A second step 520 includes the MS estimating a time of arrival of the at least one satellite transmitted signal. A third step 530 includes the MS receiving at least one terrestrial base station signal with a second receiver. A fourth step 540 includes the MS estimating a time of arrival of the at least one terrestrial base station signal. A fifth step 550 includes the MS estimating its position based on the estimated time of arrival of the at least one satellite transmitted signal and the estimated time of arrival of the at least one terrestrial base station signal.

Figure 6:
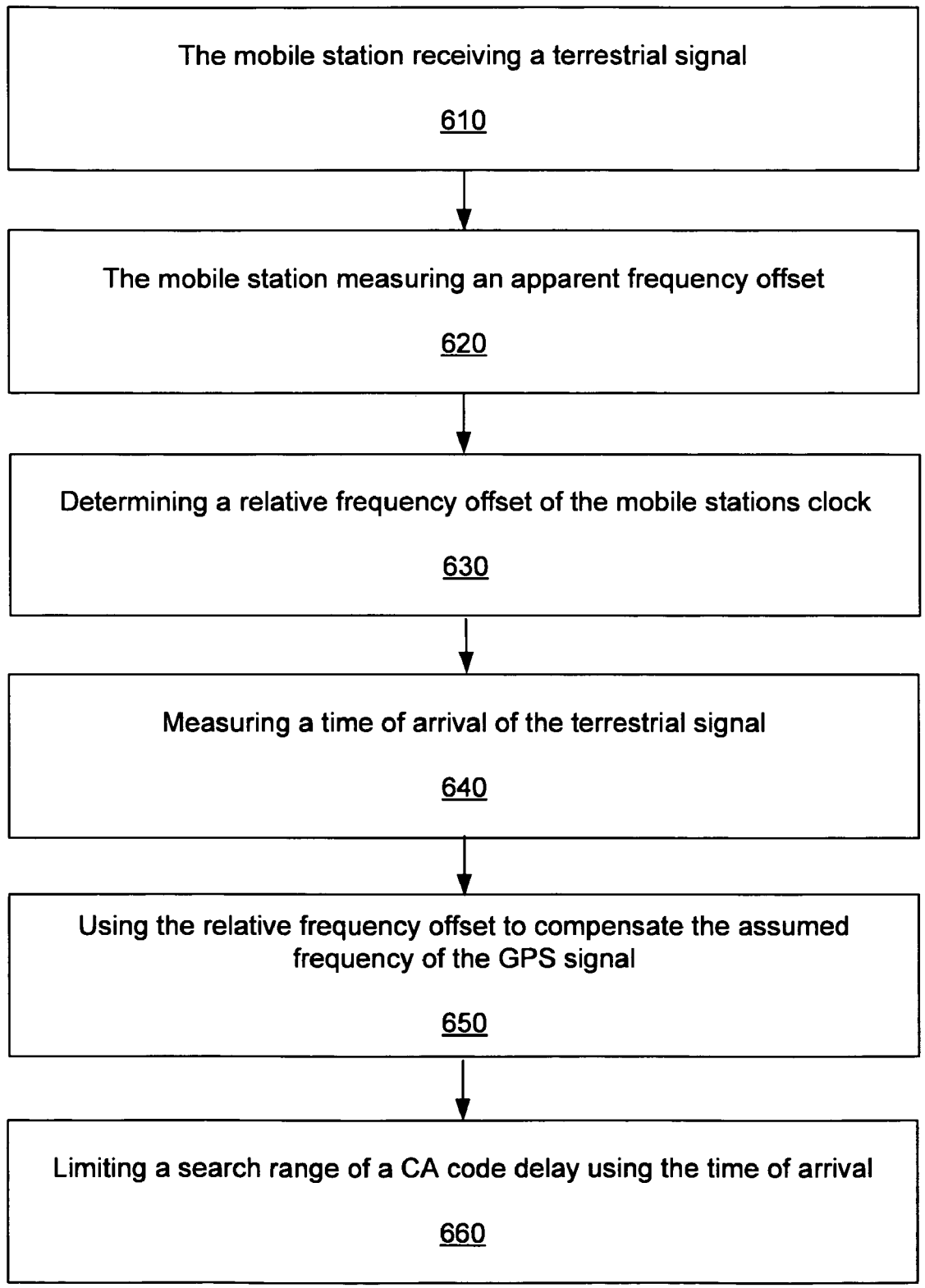
FIG. 6 is a flow chart that includes steps of another example of a method of a mobile subscriber (MS) estimating position.

FIG. 6 is a flow chart that includes steps of another example of a method of a mobile subscriber (MS) estimating position. A first step 610 includes the mobile station receiving a terrestrial signal. A second step 620 includes the mobile station measuring an apparent frequency offset. A third step 630 includes determining a relative frequency offset of the mobile stations clock. A fourth step 640 includes measuring a time of arrival of the terrestrial signal. A fifth step 650 includes using the relative frequency offset to compensate the assumed frequency of the GPS signal. A sixth step 660 includes limiting a search range of a CA code delay using the time of arrival.

An embodiment of the MS estimates its position based on the estimated time of arrival of the at least one satellite transmitted signal and the estimated time of arrival of the at least one terrestrial base station signal. One embodiment includes the estimate being performed by the MS by comparing the time of arrival of each of the at least one satellite transmitted signal and the at least one terrestrial base station with a local clock reference.

In the case in which the one or more terrestrial base stations transmits the first sample of the preamble in alignment with the satellite signal time reference (for example, GPS time), the time of arrival measurements may be used directly in determining quantities such as position or time. If the base station timing is offset from, for example GPS time, the offset may be transmitted to the MS through a message or otherwise known. This offset in time relative to GPS time may be used to compensate the time-of-arrival measurements. In another implementation, the offset for a non-serving base station may be known and compensated by information communicated by the serving base station.

An embodiment includes estimating the time of arrival of the terrestrial transmitted signals using a quantity proportional to the difference between the time of transmission of the terrestrial signal and the time of transmission of the received satellite signal. The difference between the transmit times can be determined as described above. If the base station (terrestrial signal transmitter) has an unknown timing offset, the time of arrival of the terrestrial signals can be measured, but may not be directly for position determination. If, for example, the base station is not aligned with GPS, a method of determining the offset of the base station is needed.

For one embodiment, a monitoring station can provide the offset. For WiMAX signals, the WiMAX transmitters are aligned with GPS time. An embodiment includes a server than has the positions and timing offsets of each WiMAX transmitters which are available to the serving base stations, and therefore, the mobile subscribers.

As previously described, one base station can be designated as a serving base station. An embodiment includes two-way communication of the MS only occurring between the MS and the serving base station, whereas the MS receives signals from the other base stations for position determination. Serving base station identification and/or designation through the pseudorandom sequence transmitted by the base station and additionally through messages passed between the base station and the subscriber. As the MS changes its physical location, the base station designated as the serving base station can change. For an embodiment, the serving base station is the base station that has the highest quality link with the MS. The positions of the base stations are know, or presumed known in order to allow trilateration.

An embodiment includes the serving base station providing information to the MS that aids the MS in determining its position. For example, the serving base station can provide position information of the other base stations the MS is receiving wireless signals. That is, base stations other than the serving base station. This information can aid the MS in estimating a time of arrival of the wireless signals. Other information includes timing offset information of the other base station signals that the MS is receiving wireless signals. Generally, the timing offset needs to be known in order to do trilateration based on time of arrival.

Additionally the serving base station can provide the MS with a neighbor base station advertisement list that the MS uses to identify the base stations that the MS receives terrestrial signals. The neighbor base station advertisement list allows the MS to identify other base stations available as serving base stations if the MS changes its physical location. The neighboring base station advertisement list can provide the MS with base stations that the MS is likely to be able to receive position determining wireless signals. The neighbor advertisement list is nominally used to identify to the subscriber good candidate base stations to hand off to. That is, the base stations with which the subscriber is likely to find a link having a good signal-to-noise ratio, are generally also base stations the subscriber is likely to receive good terrestrial position signals.

In addition to base station information, the serving base station can provide the MS with satellite information. For example, the serving base station providing the MS with information of satellites the MS is likely to receive the at least one satellite transmitted signal. Additional/alternative satellite information includes navigation data of the satellites, code data of the satellites, satellite visibility, and satellite elevation.

The navigation data can include satellite orbit parameters, satellite clock offset, and raw navigation data bits. The navigation data bits can be used by the MS to allow coherent integration of the received satellite signals for periods longer than the duration of a single GPS navigation bit. Nominally, the period of the GPS navigation bit is 20 milliseconds.

One embodiment includes the MS estimating timing and frequency offsets based on the at least one satellite transmitted signal. The MS can then aid acquisition of the at least one terrestrial base station signal based on based on the timing and frequency offsets of the MS. If a sufficient number of GPS signals can be acquired, the MS can determine both the relative frequency offset of the MS clock as well as the offset of the clock relative to GPS time. With the frequency offset, the terrestrial (for example, WiMAX) signal does not have to be searched over frequency. Knowledge of time allows determination of, for example, the timing of a preamble of a WiMAX frame. As a result, the MS can synchronize to the WiMAX signal with substantially less effort, saving time and power consumption.

Another embodiment includes the MS estimating timing and frequency offsets of the MS based on the at least one terrestrial base station signal. The MS can then aid acquisition of the at least one satellite transmitted signal based on based on the timing and frequency offsets of the MS.

An embodiment includes the MS using the at least one terrestrial base station signal to limit a frequency code and phase search range of the at least one satellite transmitted signal. If, for example, the MS is synchronized to a base station, by virtue of the fact that the base stations are synchronized with GPS, their preambles are aligned with the GPS second. The GPS receivers used in the base stations to maintain time alignment typically produce a corrected reference frequency output that is synchronized to GPS. This reference frequency is typically used in the synthesizer of the base station. As a result, the center frequency of the transmitted terrestrial signal is synchronized with the frequencies used in the GPS system. The apparent frequency offset of the MS clock can be then used to limit the range of frequencies over which to search for the GPS signal.

The transmitted signal from the i th GPS satellite may be modeled as $$s_i(t) = \alpha \sin(2\pi f_{L1} t) m_i(t) D_i(t),$$

where $\alpha$ denotes the amplitude, $f_{L1}$ is the L1 carrier center frequency, i.e., 1575.42 MHz, $m_i \in \{-1,1\}$ is modulation of C/A code, and $D_i \in \{-1,1\}$ is the transmitted telemetry data. The last two quantities are satellite specific. Let $s_{rx}(k)$ denote samples of the received down-converted GPS signals which is modeled according to:

$$s_{rx}(k) = \sum_i \alpha_i e^{j2\pi f_i kT_s} m_i(kT - \tau_i) D_i(kT - \tau_i) + n(k),$$

where $\alpha_i$ denotes the complex amplitude of the signal received from the i th satellite, $f_i$, it's received center frequency, and $n(k)$ is the additive received noise. The center frequency is generally shifted due to the velocity of the satellite, user motion, and frequency offset of the receiver clock. The terms corresponding to the C/A code and the telemetry data are seen to be shifted.

The cross correlation of the received down-converted GPS signal with a locally generated replica is approximately;

$$R_i(\hat{f}_i, \hat{\tau}_i) = \sum_{k=1}^{N} (s_{rx}(k) * h(k)) e^{j2\pi \hat{f}_i kT_s} m(kT_s - \hat{\tau}_i),$$

where $h(k)$ denotes the baseband equivalent of the cascade of filters in the system, $*$ denotes convolution, $\hat{\tau}_i$ is the timing offset of the locally generated code replica and $\hat{f}_i$ is the frequency offset applied to the received signal prior to correlating it with the locally generated code replica.

The above cross correlation function can be approximated as $$R_i(\hat{f}_i, \hat{\tau}_i) = N\alpha(\Lambda((\tau_i - \hat{\tau}_i)1.023 \text{ MHz})*h)\text{sinc}((f_i - \hat{f}_i)NT_s) + \eta_i$$

Here, $\Lambda(\cdot)$ denotes Bracewell's triangle function according to $$\Lambda(x) = \begin{cases} 1 - |x| & |x| \leq 1 \\ 0 & \text{else} \end{cases},$$

h denotes the continuous-time equivalent of h(k), and $\eta_i$ is the i th resulting noise term after correlating.

Figure 7:
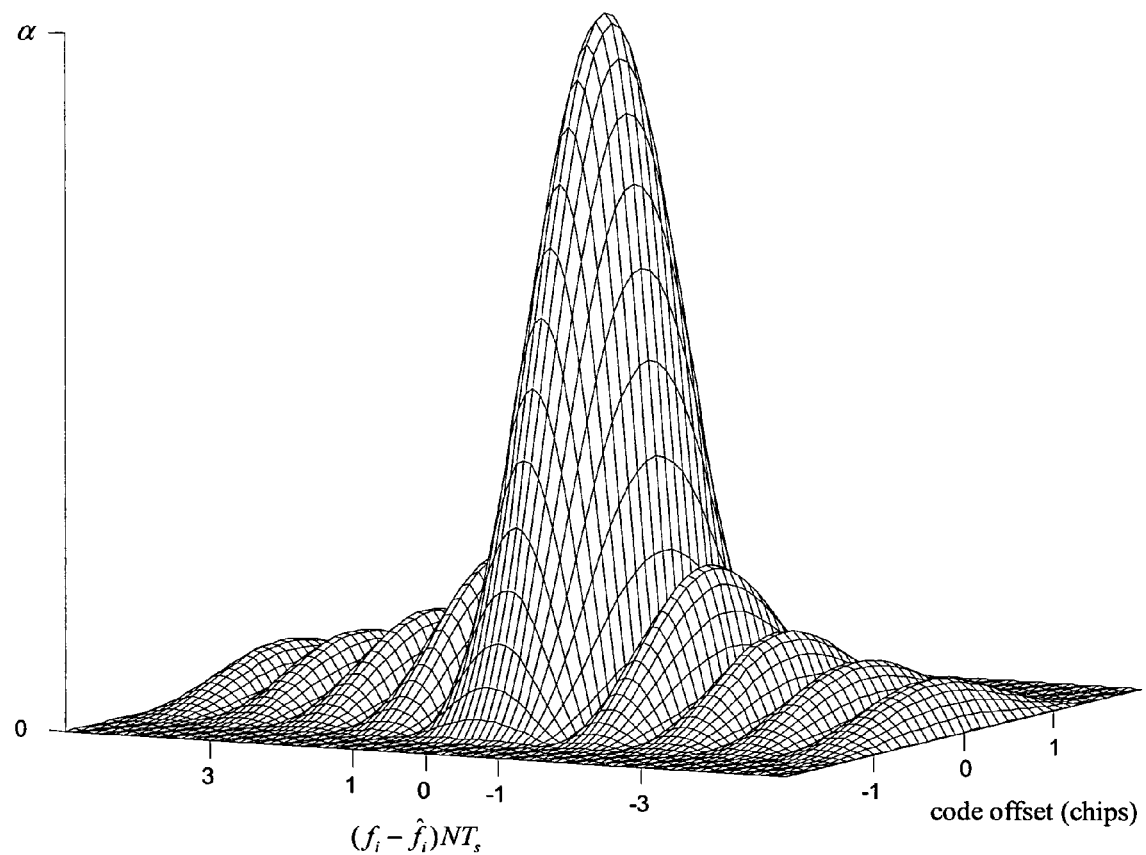
FIG. 7 shows an example of cross correlation of received signal with respect to locally generated code and carrier signals.

FIG. 7 shows an example of a cross correlation of received signal with respect to locally generated code and carrier signals. Here, one of the dimensions is frequency, the other is code phase. It can be observed that for the cross correlation to achieve a relatively large value, and therefore, the i th GPS signal to be detected, it is necessary that the product of $\Lambda((\tau_i - \hat{\tau}_i)1.023 \text{ MHz})$ and $\text{sinc}((f_i - \hat{f}_i)NT_s)$, and hence the individual terms, be comparable to unity.

The quantity $NT_s$ has the interpretation of integrationn time. Longer integration times yield an improvement in the signal to noise ratio that is linear in time. The cross-correlation function is proportional to $\text{sinc}((f_i - \hat{f}_i)NT_s)$. Therefore, for a fixed degradation in sensitivity, less frequency offset between the assumed and actual frequency of the received satellite may be accommodated as the integration time is increased. This implies that for a fixed frequency uncertainty, more frequency hypotheses need to be tried. It can be observed that there is a tradeoff between sensitivity and the complexity of the search. From the above expression, it can also be observed that the cross correlation function is a function of the time offset $(\tau_i - \hat{\tau}_i)$.

Communicating with a WiMAX base station substantially decreases the effort associated with searching for the GPS satellite signals. Absent other information, the frequency offset of the MS reference clock may be off several parts per million (PPM), which at GPS frequencies corresponds to approximately a +/-5 KHz frequency uncertainty. When tracking the signals from a WiMAX base station, the frequency may be approximated to within 50 Hz.

The GPS C/A code repeats with a period of 1 millisecond. When attached to a serving base station, the distance from the subscriber to the base station is typically less than 3 km. If the WiMAX base station is synchronized to GPS time and its position known, the time of arrival of the WiMAX signal is known to be limited to within 5 us (the time it takes light to travel half of the cell radius). Therefore, instead of having to search over one millisecond of uncertainty (the entire C/A code sequence), only offsets associated with possible locations within the cell site need to be searched, which corresponds to an interval that is approximately 10 chips wide. This reduces the search size by approximately 100.

Therefore, the complexity of the search for the GPS satellite signal has been reduced by a factor of approximately 10000. This results in a substantial savings in power savings of power. The reduced complexity of the search allows acceptable performance with less complex hardware implementations and lower cost. In another embodiment, a GPS receiver may be used which is capable of examining only a subset of the possible code phases and frequency offsets. Such a GPS receiver has the advantage of reduced size and power consumption.

Figure 8:
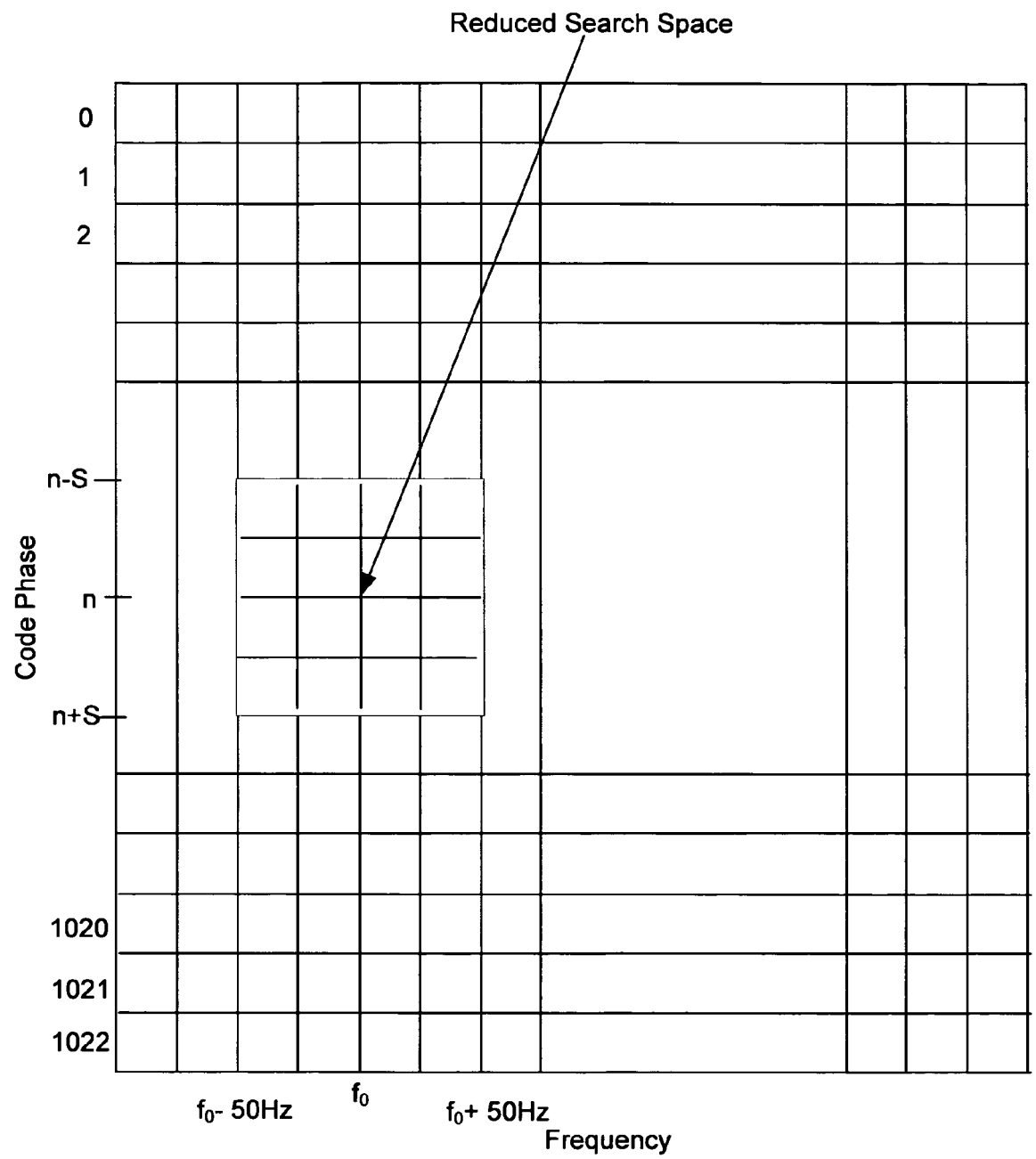
FIG. 8 shows an example of a reduced search space when frequency uncertainty and timing uncertainty have been reduced using timing and frequency information received from a serving base station.

FIG. 8 shows an example of a reduced search space when the frequency uncertainty and timing uncertainty are reduced using timing and frequency information derived from a connection to a serving base station.

An embodiment includes the terrestrial base station signals being WiMAX signals. That is, the terrestrial base stations and the MS are all capable of wireless communication according to the WiMAX standard. Estimate times of arrival of the WiMAX base station transmitted signals are estimated at the MS. This embodiment includes the MS extracting information from a WiMAX downlink frame preamble of the WiMAX signal.

One method the MS uses to extract information from the WiMAX downlink frame preamble includes the MS determining a channel impulse response of the preamble. The time of arrival can be estimated by comparing a peak of the channel impulse response with a pre-estimated start time of the WiMAX downlink frame preamble. The pre-estimated start time can be estimated, and represents the best a-priori estimate of the time of arrival of the CIR (channel impulse response) prior to making the measurement of the time offset. The measured time offset of the channel impulse response (CIR) equals the difference between the start time and the actual time of arrival of the first sample of the preamble. If the received start time is advanced, the location of the CIR appears more delayed. If the received start time is delayed, the measured time of arrival of the CIR time offset advanced.

One method of determining a channel impulse response of the preamble includes performing an FFT on the WiMAX downlink frame preamble, correlating an output of the FFT with a predetermined PRBS, and performing an IFFT on the correlated output.

Although specific embodiments of the invention have been described and illustrated, the invention is not to be limited to the specific forms or arrangements of parts so described and illustrated. The invention is limited only by the appended claims.

What is claimed:

1. A method of a mobile subscriber (MS) estimating position, comprising:
    the MS receiving at least one satellite transmitted signal with a first receiver;
    the MS estimating a time of arrival of the at least one satellite transmitted signal;
    the MS receiving a plurality of terrestrial base station signals from a plurality of base stations with a second receiver, the MS identifying one of a plurality base stations as a serving base station;
    the MS determining a timing offset of the plurality of terrestrial base stations signals through communication with the serving base station;
    the MS estimating a time of arrival of each of the plurality terrestrial base station signals;
    compensating the estimated time of arrival of each of the plurality of terrestrial base station signals using the timing offset of the corresponding terrestrial base station signal, wherein the timing offset comprises a quantity proportional to the difference between the time of transmission of the terrestrial base station signal and the time of transmission of the received satellite signal;
    the MS estimating its position based on the estimated time of arrival of the at least one satellite transmitted signal and the compensated estimated times of arrival of the plurality of terrestrial base station signals.

2. The method of claim 1, further comprising the MS communicating information with only the serving base station.

3. The method of claim 1, further comprising the serving base station of the MS changing as the MS changes physical locations.

4. The method of claim 1, further comprising the MS determining a position of each of the plurality of base stations through communication with the serving base station.

5. The method of claim 1, further comprising the serving base station providing the MS with a neighbor base station advertisement list that the MS uses to identify the plurality of base stations that the MS receives the plurality of terrestrial base station signals.

6. The method of claim 1, further comprising the serving base station providing the MS with a neighbor base station advertisement list that the MS uses to identify other base stations available as serving base stations if the MS changes its physical location.

7. The method of claim 1, wherein the MS uses the plurality of terrestrial base station signals to limit a frequency and code phase search range of the at least one satellite transmitted signal.

8. The method of claim 1, further comprising the serving base station providing the MS with information of satellites the MS is likely to receive the at least one satellite transmitted signal.

9. The method of claim 8, wherein the information of the satellites comprises at least one of navigation data of the satellites, code data of the satellites, satellite visibility, and satellite elevation.

10. The method of claim 9, wherein the navigation data comprises at least one of satellite orbit parameters, satellite clock offset, raw navigation data bits.

11. The method of claim 9, wherein the navigation data comprises raw navigation data bits, and the MS receiving the at least one satellite transmitted signal comprises coherently detecting the navigation data bits for a time duration equivalent to a time duration of the navigation data bits.

12. The method of claim 1, further comprising:
    estimating timing and frequency offsets of the MS based on the at least one satellite transmitted signal;
    aiding MS acquisition of the plurality of terrestrial base stations signal based on the timing and frequency offsets of the MS.

13. The method of claim 1, further comprising:
    estimating timing and frequency offsets of the MS based on the at least one terrestrial base station signal;
    aiding MS acquisition of the at least one satellite transmitted signal based on the timing and frequency offsets of the MS.

14. The method of claim 1, wherein estimating the time of arrival of the plurality of terrestrial base station signals comprises:
    extracting information from a WiMAX downlink frame preamble.

15. The method of claim 14, wherein extracting information from a WiMAX downlink frame preamble comprises:
    determining a channel impulse response of the preamble;
    estimating the time of arrival by comparing a peak of the channel impulse response with a pre-estimated start time of the WiMAX downlink frame preamble.

16. The method of claim 15, wherein determining a channel impulse response of the preamble comprises:
    performing an FFT on the WiMAX downlink frame preamble;
    correlating an output of the FFT with a predetermined PRBS;
    performing an IFFT on the correlated output.

17. The method of claim 7, further comprising:
a GPS processor calculating a GPS position using the limited frequency and code phase range.

18. A WiMAX subscriber, comprising:
means for the subscriber receiving at least one GPS signal with a first receiver;
means for the subscriber estimating a time of arrival of the at least one GPS signal;
means for the subscriber receiving a plurality of WiMAX base station signals from a plurality of base stations with a second receiver, the subscriber identifying one of the plurality of base stations as a serving base station;
the subscriber determining a timing offset of the plurality of WiMAX base stations signals through communication with the serving base station;
means for the subscriber estimating a time of arrival of each of the plurality of WiMAX base station signals;
means for compensating the estimated time of arrival of each of the plurality of WiMAX base station signals using the timing offset of the corresponding WiMAX base station signal, wherein the timing offset comprises a quantity proportional to the difference between the time of transmission of the WiMAX base station signal and the time of transmission of the GPS signal;
means for the subscriber estimating its position based on the estimated time of arrival of the at least one GPS signal and the compensated estimated times of arrival of the plurality of WiMAX base station signals.

19. The WiMAX subscriber of claim 18, further comprising:
means for the subscriber using plurality of WiMAX base station signals to limit a frequency and code phase search range of the at least one GPS signal.

20. The WiMAX subscriber of claim 19, further comprising:
a GPS processor calculating a GPS position using the limited frequency and code phase range.

* * * * *